April 6, 1965   R. P. FORSBERG ETAL   3,176,618
ROCKET MOTOR CONSTRUCTION AND FABRICATION PROCESS
Filed June 14, 1961   3 Sheets-Sheet 1
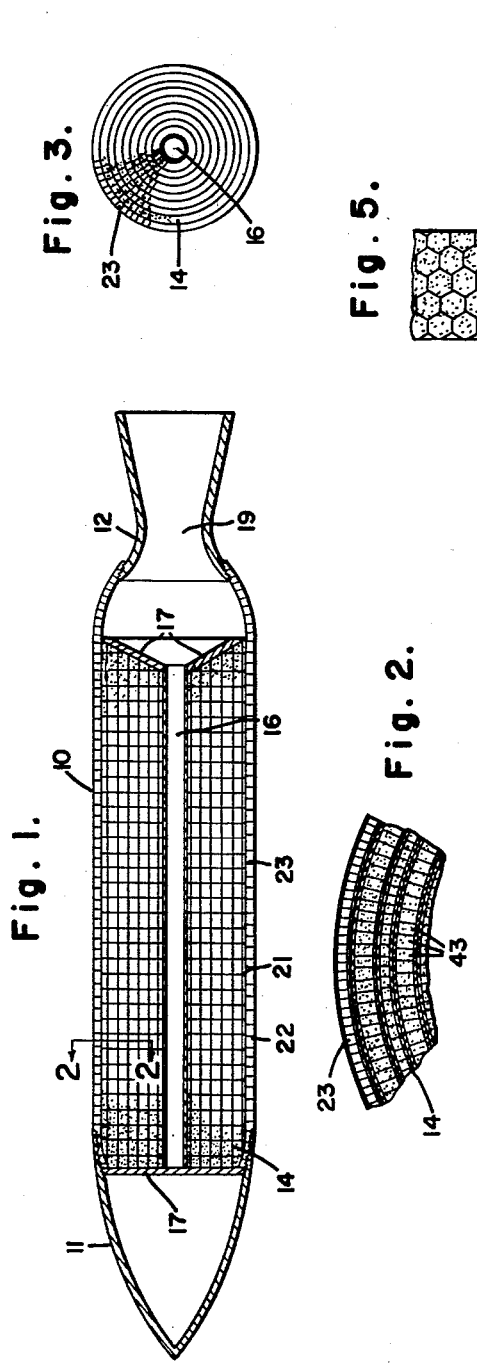
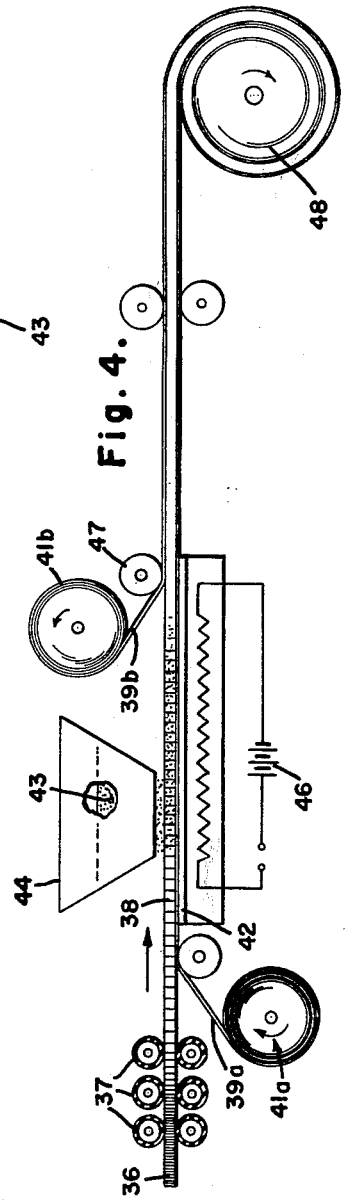
INVENTORS
Richard P. Forsberg
John P. Schafer
Wells A. Webb
BY
Townsend and Townsend
attorneys April 6, 1965 R. P. FORSBERG ETAL 3,176,618
ROCKET MOTOR CONSTRUCTION AND FABRICATION PROCESS
Filed June 14, 1961 3 Sheets-Sheet 2

INVENTORS
Richard P. Forsberg
John P. Schafer
BY Wells A. Webb

Townsend and Townsend
attorneys

April 6, 1965  R. P. FORSBERG ETAL  3,176,618
ROCKET MOTOR CONSTRUCTION AND FABRICATION PROCESS
Filed June 14, 1961  3 Sheets-Sheet 3
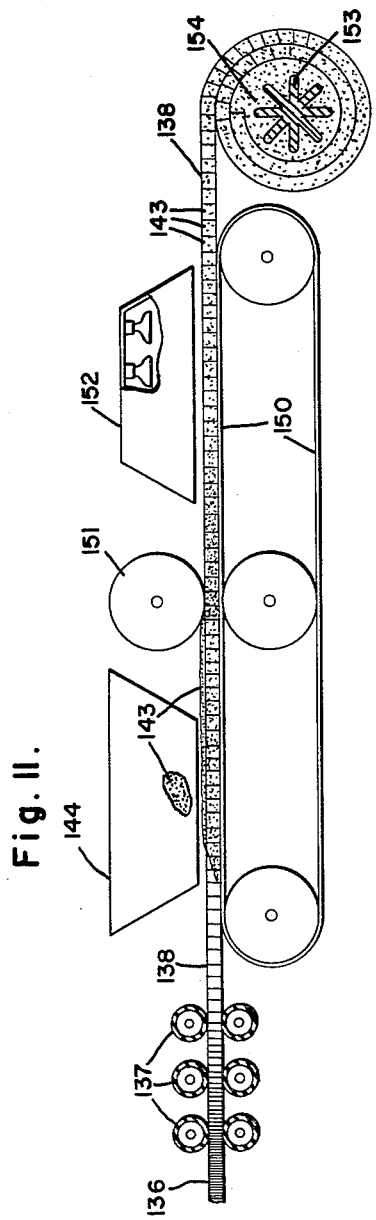
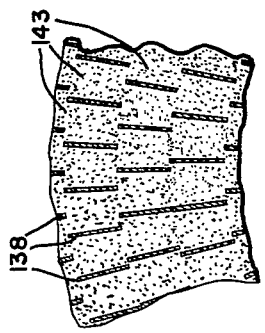
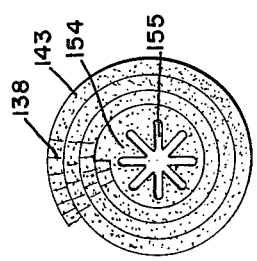
INVENTORS
Richard P. Forsberg
John P. Schafer
Wells A. Webb
BY
Townsend and Townsend
attorneys

United States Patent Office 3,176,618
Patented Apr. 6, 1965

3,176,618
ROCKET MOTOR CONSTRUCTION AND
FABRICATION PROCESS
Richard P. Forsberg, John P. Schafer, and Wells A. Webb, all of Berkeley, Calif., assignors to Hexcel Products, Inc., Berkeley, Calif., a corporation of California
Filed June 14, 1961, Ser. No. 117,123
15 Claims. (Cl. 102—98)

This invention relates to rocket motor construction, and more particularly to a rocket motor and process of making same in which the motor has a multi-cellular reinforcing grain.

In the initial stages of rocket development, though it was conventional to employ liquid propellants, their numerous disadvantages led to the increasing utilization of solid propellants of one sort or another. Various combinations including double base, heterogeneous and composites thereof have evolved to provide the specific impulses in the 250–300 sec. range that are necessary to permit rockets to break through atmospheric barrier surrounding the earth with reasonably adequate payloads. While solid propellants are superior to liquid propellants in some respects, they too have drawbacks. Heretofore virtually all rocket motor grains have been formed by casting or extruding solid propellant to approximate the interior contour of the rocket shell. For relatively small rockets, which do not require high initial thrusts to obtain suitable initial accelerating rates, these techniques work well enough, although even these have certain dangerous shortcomings in the case of some double base propellants. As the size of rockets has increased to provide the thrust for larger payloads, the disadvantages of solid propellants have increased at least proportionately. The casting of relatively large and complex shapes is accompanied by shrinkage and crystalline stresses, all of which increase the likelihood of cracks or other damage to the grain structure. Then, too, the low structural strength of cast propellants, particularly those classified as heterogeneous, due to the relatively high proportion of oxidants to propellant makes some sort of reinforcing technique necessary or at least desirable. Since the more or less ideal stoichiometric ratio approaches 9:1, the cohesiveness of mixed propellant is demonstratably poor.

It was in an effort to improve the structural rigidity of large, solid propellant grains that it was proposed in the co-pending applications, Serial Nos. 728,432, now abandoned, and 804,847, now Patent No. 3,130,672 filed on April 14, 1958 and April 7, 1959, respectively, that a burnable structural honeycomb fuel element employed as an integral part of the propellant grain. The honeycomb increases the structural strength of the propellant, but not at the expense of the quantity of propellant since it acts as an integral part of the impulse generating material. As pointed out in more detail in application Serial No. 728,432, by properly selecting the type, thickness and orientation of the cells, a honeycomb matrix contributes to the uniform burning rate which is all important for maintaining a relatively constant pressure in the rocket combustion chamber. In the exemplary structures illustrated in the above noted applications, a convolutional honeycomb structure is provided in which is stored the combined oxidant and propellant. Typical of the combinations used is polyethylene propellant and ammonium perchlorate oxidizer. The use of the honeycomb matrix permits shrinkage and/or expansion to be neutralized inasmuch as the honeycomb cells will contract or expand to compensate for the contraction coefficient of the propellant material.

In spite of advantages honeycomb has as a propellant, earlier methods of forming the honeycomb grains have certain limitations. One of the problems which has become more evident as the technology of rocket grain construction and burning has increased is that it is desirable to separate the fuel and the oxidizer in grain structures. Since the temperatures and pressures at which conventional oxidizers and propellants can be loaded into the cells of honeycomb are quite different, it is impossible to load alternative cells in a unitary structure without risking low order explosions or other dangers. The present invention is designed in part to overcome this construction limitation while retaining the structural advantages of a fuel component. The rocket grain is formed through the use of a plurality of strips or ribbons of an expanded honeycomb material that are pre-filled with a propellant and thereafter helically wound around a mandrel with or without interleaving layers of aluminum foil between adjacent tapes of the honeycomb.

In the present structure, which is principally designed for internal or internal-external burning rockets, it is possible to pre-load the honeycomb with a minimum of difficulty and maximum control over the finished grain structure. The use of a plurality of relatively narrow honeycomb strips helically wound about the combustion chamber space also allows the burning rate and pressure distribution to be controlled in part by varying cell thicknesses.

Another advantage of helically forming the grain occurs because a helically wound member resiliently reacts to externally applied forces. This overcomes one of the principal shortcomings of large solid propellant grains. When a rocket is fired, the pressures initially developed place extreme requirements on the grain. When failures occur, it is usual that the large grains have broken away from the motor shell or fissures occurred. Either constitutes a spurious path for flame propagation. Due to the helix, although the grain members are adhesively secured layer on layer, the grain tends to resiliently extend under the initial transient pressures. Damage to the grain as a result is minimized. Judicious selection of honeycomb size, thickness, and the adhesive employed to bind the honeycomb internally and to the shell permit the influence of transients to be minimized. It should be emphasized that while the exemplary embodiment herein disclosed employs aluminum honeycomb, any material that adds strength to the finished grain may be used. The principal limitation is that the material should not materially reduce the specific impulse of the rocket, and preferably, the material should burn and contribute to the total energy developed.

The use of an interleaved foil of aluminum between adjoining strips of helically formed honeycomb provides high conduction paths from the exterior of the grain to the interior of the grain. Since the conductivity of the aluminum foil is much higher than that of the propellant or oxidizer, as the grain is subjected to temperature recycling (during storage), the aluminum reduces the temperature gradient throughout the grain. This retards the extreme gradients which may cause the grain to separate from the shell. These gradients in many cases may be as high as 150 to 200° F.

In one type of construction herein proposed, the helically wound honeycomb grain is combined with a shell formed by a pair of concentric skins of relatively thin material on each side of a radially oriented honeycomb. Solid shells not only add to the dead weight which the propellant thrust must overcome, but also create weak points along welded seams. If the shell is built to minimize dead weight the extremely high pressures incident to the initial detonation of the propellant may rupture the weld. A honeycomb sandwich in the shell raises the hoop strength higher than that of a steel plate on a weight basis. The added strength per unit of weight is obtained with a substantial increase in reliability. Again, the shell seams have less demanded of them and can contain the high initial pressures. Another variant shell construction envisions the use of a sheath on each side of the honeycomb sandwich formed with fiberglass threads or strips integrally joined together by an adhesive. The fiberglass can be highly polished on the exterior to provide minimum drag to the rocket and also, due to its particular characteristics avoid the weakness of welded seams.

In its more basic form the invention utilizes the concept of filling strips or ribbons of expanded honeycomb with a plastic or deformable amorphous mass (such as a propellant), and spirally winding the loaded honeycomb around itself layer on layer without interleaving any face skins or hoop material between adjacent layers. Preferably the amorphous mass is of a type that will adhere itself to the walls of the honeycomb material, and also will cohere to itself at the interfaces of successively wound layers whereby the ultimate structure comprises a coherent mass of propellant or the like reinforced throughout its body by tightly wrapped spirals or structural honeycomb fuel.

In addition to providing a novel structure, the present invention visualizes an improved process for forming the honeycomb strips as well as the rocket grain. A strip of honeycomb of a desired height is moved along a flat bed and, in the process of the translation, it is expanded a preselected amount, filled with a propellant, oxidizer or combination thereof, solidified and rolled for storage. In some cases, thin foil covers are applied to one or both sides of the filled honeycomb, although in other practical applications no covers or skins are employed at all.

In the case of the grain forming apparatus, a rotating mandrel cooperates with a plurality of supplies of filled honeycomb strips, and, if used, a supply of the interleaving foil or sheet and adhesive means. As the mandrel is rotated, two or more strips of honeycomb are helically wound along the mandrel. When skins or covers are employed the same are interleaved between layers of honeycomb so as to overlie one honeycomb strip and lie beneath the adjacent one. When made of metal the interleaved sheets provide good conductive paths between adjacent layers of the finished grain. The number of layers of honeycomb strips depends upon the particular size and configuration of the rocket motor, but the basic means of fabrication is the same.

After the honeycomb strips are expanded, filled and wound helically along the moving mandrel in a desired combination of propellant and oxidizer, the shell of the rocket may be formed thereover. This may be done by forming it on the rotating grain. Exemplarily, an empty honeycomb sandwich is helically wound between a pair of metal plates. Alternatively, the plate coverings for the honeycomb forming the shell may have substituted for them layers of adhesively impregnated fiberglass. In the latter case, heat applied to the structure will cause the fiberglass to fuse and form a tight skin about the honeycomb foundation. It can be machined subsequently and polished to provide minimum aerodynamic drag. The use of fiberglass avoids and otherwise improves the strength and aerodynamic characteristics of the shell without interfering with the hoop strength of the rocket motor.

The foregoing advantages and features of the grain and shell construction as well as the process for fabricating them will be more fully understood when the following detailed description is read with reference to the drawings, in which:

FIG. 1 is a cross section of a rocket motor having a grain configuration constructed in accordance with the present invention;

FIG. 2 is a partial cross section taken along line 2—2 of FIG. 1 to illustrate the arrangement of layers of honeycomb forming the grain and the single honeycomb foundation of the shell;

FIG. 3 is a cross section end view of the honeycomb matrix of the grain forming the present invention;

FIG. 4 is a schematic diagram of exemplary apparatus and method for expanding and filling honeycomb strips with propellant components;

FIG. 5 is a plan view of a part of a honeycomb strip expanded and filled by the apparatus and method illustrated in FIG. 4;

FIG. 11 is a schematic diagram of a modified form of apparatus and method according to the invention;

FIG. 12 is a transverse sectional view of the structure produced according to the method shown in FIG. 11 with the star-shaped winding mandrel withdrawn.

FIG. 13 is an enlarged fragmentary section of the structure shown in FIG. 11.

Figure 6:
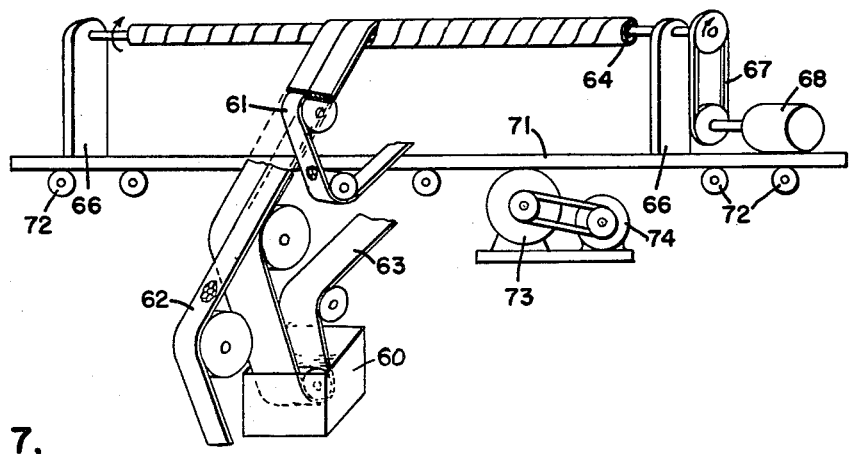
FIG. 6 is a perspective schematic of apparatus designed to illustrate one exemplary process of forming helically wound honeycomb grains.

Looking first to FIGS. 1, 2 and 3, the rocket motor can be seen to include a shell 10 having a threaded steel nose cone 11 attached to its forward end and a discharge nozzle 12 threadedly attached to its rear end. Supported interior of the rocket motor is a honeycomb grain structurt 14 formed in accordance with the teaching of the present invention. In the particular example illustrated in FIG. 1, the grain 14 is an internal burning one and therefore has a combustion chamber 16 formed along the longitudinal axis of the rocket and flame shields 17 are provided at the forward and rear sides of the rocket grain 14 to control the burning and to restrict it to a radial direction.

The discharge nozzle of throat 19 along with the shape and volume of the combustion chamber 16 determine to a large extent the burning characteristics of the grain as well as the pressures generated during the course of burning. It is necessary to maintain a relatively constant pressure in the combustion chamber 16 during the course of burning to minimize control problems and to maximize the impulse obtained when the rocket is fired.

In the exemplary embodiment of FIGS. 1–3, the shell 10 comprises a pair of concentric cylindrical plates 21 and 22 with a hollow honeycomb section 23 supported therebetween. The construction of this particular type of shell will be described in more detail below. Suffice it here to note that the shell 10 and the grain 14 are held together by adhesive deposited between their cooperating surfaces. A neutral adhesive which does not retard the burning nor, in most cases, promote it also bonds the grain to the flame shield 17 and adjacent layers of the grain to each other. It is necessary to provide an integral structure in order to avoid spurious paths for the flame front which occur if a propellant grain breaks away from its flame shield or motor shell.

It should also be noted (FIGS. 2 and 3) that the relative height or thickness of the adjacent layers of honeycomb filled with propellants and/or oxidizers can be varied to provide various burning rates and configurations in accordance with the particular purpose for which the rocket is constructed. This aspect of the honeycomb construction is treated in more detail in co-pending application, Serial No. 728,432 identified above.

Turning to FIG. 4, apparatus is illustrated for stretching a strip of honeycomb, filling the cells with a propellant-oxidizer and storing the resultant strip for use in forming a grain. The unexpanded strip of honeycomb 36 is fed betwen a plurality of rollers 37 that rotate at progressively faster rates to stretch the honeycomb (in the direction of the arrow along platform 42) as the strip 36 moves through the rollers 37. As the expanded honeycomb strip designated 38 moves beyond rollers 37 a thin sheet of aluminum 39a from a roller 41a may be moved under the expanded honeycomb strip 38 and along platform 42. As the expanded strip 38 and thin aluminum strip 39a move along the platform 42, a quantity of propellant 43 stored in a bin 44 is forced into the expanded cells. Heat means 46 are provided in conjunction with the platform 42 to maintain the expanded honeycomb 38 and sheet 39a at reasonably high temperatures so that the heated propellant component 43 may be forced into all the interstices of the honeycomb cells to form a solid strip of honeycomb. As the filled honeycomb strip is moved beyond the bin or container 44, a second sheet of aluminum 39b stored on a second roller 41b may feed under a guide roller 47 to be bonded to the upper surfaces of expanded honeycomb 38. The resultant honeycomb strip, filled with propellant and bonded by an adhesive or the soft propellant itself to the thin aluminum sheets, moves beyond the platform 42 and is stored on a take-up roll 48 for subsequent use in fabricating a grain such as 14. A plan view of a section of the filled and expanded honeycomb strip 38 is illustrated in FIG. 5 with the uppermost sheet of aluminum removed.

Means for applying an adhesive such as epoxy resin or some neutral adhesive between the sheets and the expanded honeycomb is not illustrated (in FIG. 4), but can be provided when required. Ordinarily, the forcing of sheet 39b against the upper surface of the filled honeycomb cells is sufficient to form a relatively air tight strip of honeycomb adaptable for subsequent use in forming a grain. This technique of forming a strip of honeycomb permits the strip to be filled with a single propellant component or with separate fuel-oxidant mixtures. Separating the oxidizer and propellant during these initial operations may provide certain advantages. For example, inasmuch as the temperatures necessary to permit expanded honeycomb 38 to be filled with a normal fuel component is, substantially higher than that required for an oxidant component, separation of the processes renders the overall operation easier, much safer and reduces the likelihood of faulty grains. The selectivity that separation provides can be used to advantage in designing maximum thrust rockets.

After strips of honeycomb have been filled with propellant, they are used to form the finished radial burning grain described above. In the exemplary apparatus of FIG. 6, honeycomb strips 61 (filled with fuel) and strips 62 (filled with oxidizer) cooperate with a supply of thin aluminum interleaving shets 63 to form the grain layers, each one of which consists of alternate strips of fuel and oxidizer helically wound about the grain defining mandrel. More particularly, the apparatus includes a rotatable mandrel 64 supported by members 66 mounted on table 71 for rotation by belt drive 67 and the motor or other power device 68. As the mandrel 64 is rotated in the direction illustrated by the arrow in the figure, the strips of honeycomb fuel and oxidizer 61 and 62 are helically wrapped side by side along the length of the mandrel. This is accomplished by supporting the table 71 on guide rollers 72 and driving it in translation (to the right and left of FIG. 6 of the drawings). Drive roller 73, rotated in a selected direction by reversible motor 74, accomplishes this function.

Figure 7:
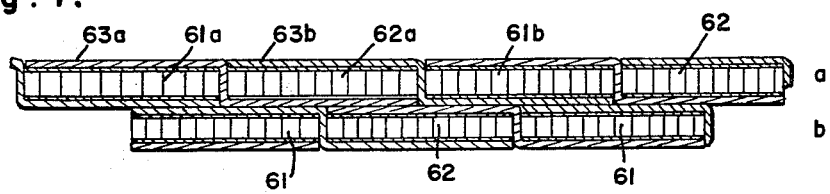
FIG. 7 is a transverse section taken through the grain to illustrate the relationship between the adjacent strips of honeycomb and interleaved sheets in each layer and between adjacent layers of the grain.

As strips 61 and 62 are wound along the mandrel, interleaving sheet 63 is fed between the two so that one side of the sheet overlies honeycomb strip 62 and the other side lies beneath strip 61. Cooperating with the sheet 63 is a source of adhesive 60 such as epoxy or some other resin which provides a bond between the adjacent strips and the interleaved sheet 63. The result is illustrated in FIG. 7.

Strips 61 and 62 alternate in each layer and sheet 63 for any layer lies alternately on the top of one strip and along the bottom of the adjacent strip. For example, strip 63a in row "a" lies along the upper surface of strip 61a and beneath strip 62a. Similarly, sheet 63b overlies honeycomb strip 62a and the other part lies beneath strip 61b. The same pattern is followed throughout the layers forming the grain 14. As can be appreciated from examining FIG. 7, the interleaved sheets 63 provide conductive paths for heat between adjacent layers of the grain 14 so that the grain has a reasonably small temperature gradient. Though this construction will not reduce the temperature gradient during burning with present short burning times, it is possible that future burning rates of solid propellants will be reduced to the point where this ancillary advantages become operative. If such develops, it will reduce discontinuities that exist between the interior of the grain through the fizz zone to the flame zone. Hence, improved pressure distribution throughout the length of the combustion chamber 16 would be obtained which would decrease undesirable side effects such as chugging. Of course, in radially burning grains, where the combustion chamber volume increases as the burning progresses, this is more of a problem than with end burning grains inasmuch as the burning area of the latter remains constant.

Figure 8:
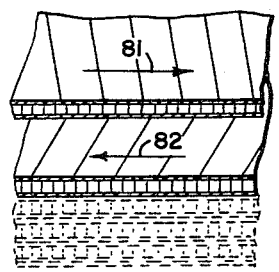
FIG. 8 is a partial exploded section of a plurality of layers forming the grain wherein the sense of the helix lead of adjacent layers are reversed.

FIG. 8 illustrates one way in which the grain construction may be varied to avoid destruction of the grain during the initial phase of launching. As is well known, rockets are subjected to large transient forces when they are initially fired and solid propellant grains of conventional fabrication have had a tendency to separate from the rocket shell or crack at such times. This is, in part, due to the extremely large forces and in part due to different coefficients of expansion for the shell and grain materials. Independently of how the shell is constructed, if the helix lead in adjacent layers of the grain formed in accordance with the present invention are reversed, the pressures tend to equalize and the contraction in the overall grain is minimized. In FIG. 8 it can be seen that adjacent layers 1 and 2 have oppositely sensed leads. The lead of the helix layer 1 moves in the direction of arrow 81 whereas the helix of layer 2 moves in the direction of arrow 82. By alternating these layers it is possible to have the compressive stresses in one layer largely counteracted by the tension stresses in the adjacent layers. The resultant disequilibrium force for the entire grain is therefore minimized. Also, the likelihood of the grain breaking away from the metal shell is reduced.

If the helically wound grain structure does not use reversing helices, it resiliently reacts to the initial forces that occur upon firing and if properly bonded to the interior of the shell will absorb the forces without breaking away from the shell or cracking. In some cases, this ability of a helically wound grain structure to absorb energy due to the initial pressures developed can be helped by forming the shell with a honeycomb matrix. Not only will the combination of a honeycomb type of shell construction materially reduce the overall dead weight of the rocket dramatically, in conjunction with the helically wound grain it utilizes the energy absorbing features of the grain to excellent advantage.

Figure 9:
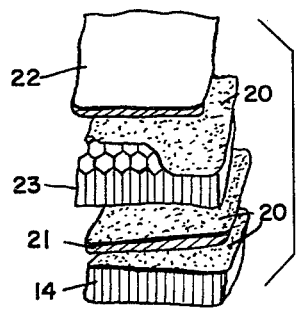
FIG. 9 is a partial exploded perspective of a cross section of one embodiment of the shell structure.

In the first embodiment of the shell which is illustrated in FIG. 9, a thin sheet of metal 21 is bonded to the outer circumference of the grain 14 by an adhesive 20 and a hollow sandwich honeycomb 23 is bonded to its outer surface. Finally, an outer sheet of polished metal 22 is bonded to the upper side of the honeycomb sandwich 23 to provide an integral central shell for a rocket motor. The honeycomb sandwich 23 is as strong or stronger than a comparable solid plate and, at the same time, is more flexible. It absorbs part of the initial energy pressures as does the grain without permanently deforming or causing a rupture of the bonding surfaces. FIG. 9 explodes the shell to illustrate the sheets 21 and 22 with the hollow honeycomb foundation 23 between them. The adhesive 20 is illustrated on the upper surfaces of the grain 14, plate 21 and honeycomb section 23 although it will be appreciated that the adhesive layer will actually bond the adjacent surfaces together.

Figure 10:
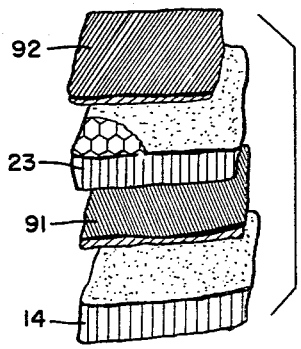
FIG. 10 is a partial exploded perspective of a cross section of a second embodiment of the shell structure.

An alternative construction of the shell is illustrated in FIG. 10 and includes an inner layer of fiberglass 91 and an outer layer 92 with the same honeycomb section 23 disposed between them. In this case, the fiberglass sheet 91 may be wound about the outer circumference of grain 14 as an impregnated thread and thereafter coalesced to form an integral support for the honeycomb sandwich 23. Formed about the outer periphery of the honeycomb sandwich 23 would be the fiberglass sheet 92 which would also be formed with impregnated fiberglass threads. In actual practice, the impregnated fiberglass sheet 91 is formed around the grain 14, the honeycomb sandwich 23 placed thereover (as a cylinder or helically wrapped strip), and the fiberglass sheet 92 wound about the sandwich 23 before heat is applied to cure the structure. Once the fiberglass has been coalesced to form a solid shell structure for the honeycomb grain, the outer surface thereof may be machined to reduce the aerodynamic drag. The overall result is a rocket motor employing helically wound strips of honeycomb formed in a plurality of layers with a honeycomb shell thereabout. This assures a structure which is adapted to overcome the large initial pressures incident to high specific impulse rockets and still provide the necessary burning characteristics that have been found useful when honeycomb is used as a rocket fuel component. At the same time, the use of the honeycomb shell permits a dramatic reduction of weight without loss of hoop strength, all of which add up to a rocket motor which has an impulse to weight ratio superior to present solid propellant grains.

Referring to FIGS. 11–13 there is disclosed a further embodiment of the present invention and in which expanded honeycomb ribbons are filled with a propellant and then wound spirally about a rotating mandrel which is withdrawn after the structure is completed to form a center burning rocket motor.

More specifically, FIG. 11 illustrates unexpanded honeycomb 136 being continuously expanded by virtue of its passage through a series of differential speed rollers 137 whereby to provide a continuously moving length of expanded honeycomb 138. Instead of feeding any kind of cover strip or face skin to the underside of the expanded honeycomb 138 as in previously described embodiments, the expanded material may be moved along the upper stretch of an endless belt conveyor 150. The belt may be formed of some suitable material, such as flexible thin metal or suitable plastic material, whose surfaces can be treated with a parting compound or separating agent (not shown) to prevent adhesion of the belt surfaces with the propellant material 143 being introduced through feed hopper 144 into the open cells of the honeycomb 138 as the latter moves continuously below the hopper. A compacting roller 151 may be provided in conjunction with the belt 150 to compress and uniformly distribute the propellant material 143 into the honeycomb cells.

In practice, it is preferred that the propellant be of a type which in its condition within the hopper is relatively fluid or pourable whereby it can be fairly easily poured or extruded so as to fill all of the honeycomb cells and leave no void areas therein. The material should also be of a type which will firmly adhere itself to the walls of the honeycomb material so as to form an intimate bond therewith. Finally, the optimum propellant should be of a type which can be partially cured or dried by predetermined oven heat (such as indicated at 152), catalytic action, polymerization, or otherwise, to a semi-solid condition in which the material will remain adhered and self-contained within the honeycomb cells as the said honeycomb is fed from the discharge end of the belt 150 and is spirally wound upon the mandrel 153. At the time of spiral winding, the partially cured or partially dried propellant must be sufficiently plastic or deformable to permit the honeycomb to wind around itself which necessarily involves some change in cell configuration. It is also considered to be of importance that the propellant material at its stage of partially dried or partially cured condition at the time it is wound spirally around itself on the mandrel be such that the propellant will cohere to itself at the interfaces of successively wound layers, whereby the ultimate structure will comprise a coherent mass of propellant reinforced throughout its body by tightly wrapped spirals of structural honeycomb fuel. In this connection, FIG. 13 shows a coherent mass of propellant 143 which is reinforced throughout its body by spiral winds of structural honeycomb that also functions as a burnable fuel component with sufficient oxidant to support its combustion being contained in predetermined (preferably stoichiometric) proportions within the propellant mass 143.

It is considered that a number of different types of known propellants would lends themselves to the several processes and products hereinabove described. For example, the propellant known as nitrosol (basically comprising a mixture of ammonium perchlorate grains or powder and nitro-cellulose mixed with a nitro-plasticizer type solvent in the form of a thick gel) is considered to be a suitable propellant in that it is capable of being poured or extruded from a feed hopper in a relatively fluid or semi-liquid condition, whereby all of the honeycomb cells can be readily filled with a minimum of void spaces. If necessary, by subjecting the material to infra-red or other heat for predetermined time intervals, the same can be thickened further by partially drying and/or curing the material so as to retain itself within the honeycomb cells during the spiral winding operation. In reference to the process described in reference to FIGS. 11–13 such partially dried or cured propellant will remain cohesive unto itself at the interfaces of adjacent layers, whereas in the earlier described embodiments the propellant will adhere itself to the free skins interleaved between the honeycomb layers. It is also considered that propellants utilizing as fuel such materials as rubber, polyurethane, polyethylene, epoxies and similar types of compounds would be quite suitable for practice of the various processes herein described. All of these materials exhibit good adhesion to metal which renders them particularly acceptable for use with aluminum honeycomb and/or aluminum or other metal alloy face skins.

Referring again to FIGS. 11 and 12, these drawings also illustrated how a center burning rocket motor with a conventional star-shaped central chamber can be produced. In this regard, a star-shaped mandrel 153 whose perimeter defines alternate lands and grooves is utilized. Prior to spirally wrapping the propellant loaded honeycomb around the mandrel, all of the star shaped recesses in the mandrel may be filled with a solid propellant such as indicated at 154. The combination of the mandrel with its recesses filled with solid propellant provides a cylinder about which the spiral wrapping of the honeycomb can proceed.

As in the manufacture of conventional molded or cast solid rockets with star-shaped chambers, the mandrel 153 may subsequently be withdrawn leaving a star-shaped center burining chamber 155 (see FIG. 12) which provides a relatively large burning area for ignition and initial combustion to occur.

While exemplary apparatus is disclosed for filling the honeycomb strips with a propellant and/or an oxidizer and winding a plurality of the strips about a mandrel to provide the completed grain structure, it should be apparent that other types of apparatus to perform these functions may be envisioned by those skilled in the art. For this reason the present invention, insofar as the

What is claimed is:

1. In a rocket motor for the utilization of high specific impulse propellants having an idealized stoichiometric ratio of propellant and oxidizer, the combination of a rocket grain having a plurality of layers of radially oriented honeycomb, said honeycomb formed of consumable material and filled with preselected fuel components, each one of said layers formed by winding strips of honeycomb helically along a supporting surface, a conductive foil helically wound intermediate adjacent layers of honeycomb in each layer to provide conductive paths between adjacent layers of the grain and an adhesive to bond the honeycomb strips and interleaving foil together to provide an integral grain structure.

2. In a rocket motor designed to utilize high specific impulse propellants having an idealized stoichiometric ratio of fuel and oxidizer, the combination of a radial burning grain defining a combustion chamber along the longitudinal axis of the motor, said grain formed of a plurality of layers of honeycomb radially oriented and formed of a consumable material, each one of said layers including a plurality of expanded honeycomb strips helically wound in side-by-side relation along the length of said grain and a conductive foil helically wound along each layer to separate adjacent strips, said conductive foil having a first lengthwise portion overlying one honeycomb strip and a second lengthwise portion underlying an adjacent strip, and an adhesive on the strips of honeycomb and interleaved foil to assure an integral cylindrical grain structure.

3. A rocket motor in accordance with claim 2 wherein certain portions of honeycomb forming each layer are filled with fuel and other portions are filled with an oxidizer in substantially stoichiometric ratio to said fuel.

4. A cylindrical grain configuration for rockets employing solid propellants having approximate stoichiometric ratios of fuel and oxidant comprising, in combination, a plurality of concentric bands of radially oriented honeycomb, the cells of said honeycomb layers having preselected amounts and kinds of fuel-oxidant stored therein, each concentric band formed by helically wrapping at least a pair of expanded honeycomb strips filled with a propellant component in side by said relationship along the full length of the grain with a conductive foil interleaved between the adjacent strips in an over and under arrangement and a bonding agent contacting the surfaces of the bands and interleaved foil to form an integral grain, the lead of the helix of adjacent layers of said grain configuration having opposite senses to minimize initial deformation upon firing a rocket utilizing the grain configuration.

5. In a rocket motor having a cylindrical shell and grain, the combination of a radially burning grain defining an internal combustion chamber along the longitudinal axis of the motor, said grain formed of a plurality of expanded bands of honeycomb constructed of consumable metal and preselectedly filled with fuel and oxidizer, each one of said bands formed by winding at least a pair of prefilled honeycomb strips in side by side relation along the length of the grain with a conductive foil interleaved between adjacent strips in an over and under fashion, and a shell formed thereabout, said shell including a pair of concentric cylindrical members having an expanded honeycomb section therebetween, said grain and shell forming a body portion of a rocket motor to which may be attached nose and nozzle-tail assemblies.

6. A rocket motor in accordance with claim 5 and including adhesive cooperating with said honeycomb strips, interleaved foil, cylindrical members and sandwich to cause said grain and shell structures to form an integral body portion that limits the burning zone of the rocket motor to the combustion chamber.

7. A rocket motor in accordance with claim 5 wherein the concentric cylinders and the honeycomb sandwich therebetween are formed of thin metal sheets and ribbons to provide hoop strength sufficient to maintain the integrity of the rocket motor for the specific impulses developed by the propellants employed.

8. A rocket motor in accordance with claim 5 wherein said concentric cylinders are formed by winding impregnated fiberglass yarn along the length of said grain and coalescing the structure to provide an integral body portion for the rocket motor.

9. A method of expanding and filling a strip of honeycomb with a propellant component comprising the steps of moving a strip of unexpanded honeycomb along a work surface, engaging the surfaces of the honeycomb strip to expand the cells of the honeycomb, forcing a quantity of propellant component into the expanded cells of the honeycomb strip overlying the work surface, causing a bond to be formed between the propellant component and the interior walls of the cells of the honeycomb strip, applying pressure to the upper and lower surfaces of the filled honeycomb strip to assure that each cell is completely filled with the propellant component, and storing the expanded and filled honeycomb for subsequent use.

10. A method of expanding and filling a strip of honeycomb with a propellant component in accordance with claim 9 and including the additional steps of moving a first foil along the work surface underlying the honeycomb strip and a second foil overlying the upper surface of the filled honeycomb strip whereby as the pressure is applied to the upper and lower surfaces of the filled honeycomb strip to eliminate voids in the cells the protective foil coverings become an integral part of the honeycomb strip.

11. A process for fabricating a cylindrical rocket grain by helically arranging in concentric layers two or more consumable honeycomb stips which separately store the fuel components comprising the steps of filling individual strips of honeycomb with selected fuel components, helically winding at least a pair of the honeycomb strips storing different fuel components in side by side relation to form each layer of the cylindrical grain, interleaving foil between adjacent strips in each layer in an over and under fashion to provide a conductive path radially of the grain and external to the fuel components and honeycomb strips, and bonding the strips and foil together to form the integral rocket grain structure.

12. In a continuous process for fabricating a rocket motor body including a cylindrical grain and shell thereabout the combination therewith comprising the steps of expanding at least two honeycomb strips made of a consumable material, filling the cells of the expanded strips with different propellant components, forming a grain utilizing a plurality of concentric layers of honeycomb by helically winding for each layer at least a pair of the honeycomb strips having the different propellant components stored therein along a supporting surface, interleaving a thin sheet of consumable material between adjacent honeycomb strips in each layer, interposing adhesive between the sheets and strips as the layers of the grain are constructed to assure an integral grain structure, forming a shell of concentric sheets and an expanded honeycomb sandwich therebetween around the outermost layer of the grain, and adhesively bonding the shell to the integral grain structure.

13. In a continuous process for fabricating a rocket motor body including a cylindrical grain and shell disposed thereabout, the combination therewith comprising the steps of individually expanding at least two honeycomb strips made of a consumable material, filling the cells of the expanded strips with different propellant components, applying foil under pressure to the open surfaces of the filled honeycomb strips to cause the fuel components to completely fill the cells thereof, forming a grain of concentric layers of honeycomb, each one of which is formed by helically winding a pair of the honeycomb strips having the different propellant components stored therein along a supporting surface and interleaving a sheet of consumable material between adjacent strips as the grain is constructed, forming a shell having an expanded honeycomb sandwich between concentric layers of coalesced sheets of glass fibers, and adhesively bonding the shell to the grain to avoid deleterious flame paths during combustion.

14. A reinforced rocket grain comprising a coherent amorphous propellant mass of fuel and oxidant; a structural honeycomb fuel component reinforcing said propellant mass substantially throughout its body; said honeycomb comprising at least one relatively narrow ribbon of expanded honeycomb helically wound into cylindrical shape extending substantially the full length of the grain; said propellant mass filling all of the cells of the honeycomb and intimately adhered to the walls of the honeycomb; said propellant mass including sufficient oxidant to support combustion of the structural honeycomb fuel component.

15. A rocket grain according to claim 14 and wherein a plurality of said ribbons of honeycomb are spirally wrapped in superposed relationship to one another to define multiple cylindrical layers of honeycomb; the said propellant cohered to itself at the interfaces between adjacent spiral wraps of honeycomb.

References Cited in the file of this patent
UNITED STATES PATENTS

| | | |
|---|---|---|
| 694,295 | Maxim | Feb. 25, 1902 |
| 2,731,379 | Wheeler | Jan. 17, 1956 |
| 2,771,035 | Clark | Nov. 20, 1956 |
| 2,939,396 | Adelman | June 7, 1960 |
| 2,952,972 | Kimmel et al. | Sept. 20, 1960 |
| 2,957,309 | Kobbeman | Oct. 25, 1960 |
| 3,035,950 | Long | May 22, 1962 |
| 3,054,679 | Bradford | Sept. 18, 1962 |
| 3,056,701 | Fritzlen | Oct. 2, 1962 |
| 3,067,686 | Coover et al. | Dec. 11, 1962 |